United States Patent
Mukkara et al.

(10) Patent No.: US 8,468,347 B2
(45) Date of Patent: Jun. 18, 2013

(54) SECURE NETWORK COMMUNICATIONS

(75) Inventors: Prakash Umasankar Mukkara, Bangalore (IN); Ajith Kumar, Bangalore (IN); Subbaraju Uppalapati, Bangalore (IN); Vishnu Vardhan, Karimnagar District (IN); Sureshkumar Thangavel, Tamilnadu (IN)

(73) Assignee: EMC Corporation, Hopkinton, MA (US)

( * ) Notice: Subject to any disclaimer, the term of this patent is extended or adjusted under 35 U.S.C. 154(b) by 733 days.

(21) Appl. No.: 12/388,658

(22) Filed: Feb. 19, 2009

(65) Prior Publication Data

US 2010/0211780 A1    Aug. 19, 2010

(51) Int. Cl.
*H04L 29/06* (2006.01)

(52) U.S. Cl.
USPC .................. 713/168; 713/160; 726/4; 726/12

(58) Field of Classification Search
USPC .................................................. 713/168, 160
See application file for complete search history.

(56) References Cited

U.S. PATENT DOCUMENTS

| | | | |
|---|---|---|---|
| 6,212,175 B1 * | 4/2001 | Harsch | 370/338 |
| 6,965,939 B2 * | 11/2005 | Cuomo et al. | 709/229 |
| 7,127,742 B2 * | 10/2006 | Kramer et al. | 726/15 |
| 7,478,434 B1 * | 1/2009 | Hinton et al. | 726/27 |
| 7,735,114 B2 * | 6/2010 | Kwan et al. | 726/1 |
| 8,156,333 B2 * | 4/2012 | Schneider | 713/168 |
| 2003/0061484 A1 * | 3/2003 | Noble | 713/168 |
| 2004/0003241 A1 * | 1/2004 | Sengodan et al. | 713/168 |
| 2006/0271671 A1 | 11/2006 | Hansen | |
| 2007/0005963 A1 * | 1/2007 | Eldar et al. | 713/168 |
| 2007/0289006 A1 * | 12/2007 | Ramachandran et al. | 726/10 |
| 2008/0162934 A1 * | 7/2008 | Okawa | 713/169 |

OTHER PUBLICATIONS

"Cold Fusion MX: Managing the client state", Livedocs.adobe.com, (Mar. 19, 2005), 4 pgs.
"Session Tracking Without Cookies", *O'Reilly*, (2002), 5 pgs.
"Tracking without cookies", arctic.org/~dean/tracking-without-cookies.html, (Feb. 17, 2003), 3 pgs.

* cited by examiner

*Primary Examiner* — Jung Kim
*Assistant Examiner* — Robert Leung
(74) *Attorney, Agent, or Firm* — Barry N. Young

(57) ABSTRACT

Apparatus, systems, and methods may operate to establish a secure communications tunnel between a server node and a client node, and to receive user requests from the client node at the server node via the secure communications tunnel. The user requests may be received in conjunction with a device verification token derived from nonces generated by the server node and transmitted to the client node as part of keep-alive response messages. The nonces may change according to a period of time established by the server node. Additional apparatus, systems, and methods are disclosed.

24 Claims, 4 Drawing Sheets

SECURE NETWORK COMMUNICATIONS

BACKGROUND

A reverse proxy or surrogate often uses browser cookies to identify user sessions that originate from a remote browser application. Thus, when a user initiates a secure sockets layer (SSL) communication session with a browser application, mutual SSL authentication is not necessarily used. Instead, other methods of authentication may be implemented, such as anonymous authentication to a Lightweight Directory Access Protocol (LDAP) directory. When this occurs, the proxy associates further communication from that particular browser based on the browser cookies, which are used to enforce user policies for authorization purposes.

However, if the browser cookies are compromised in some way, then the user's credentials have essentially been lost for whatever period of time the original authentication remains valid. A Trojan (e.g., malicious software masquerading as a useful application) might be running on the anonymous user's workstation, operating to steal browser cookies and pass them on to malicious users. This activity can thus lead to establishing unwanted SSL sessions connected to sources sponsored by malicious users on behalf of the original authenticated user.

For example, when a legitimate user first attempts to access a Hypertext Transfer Protocol (HTTP) reverse proxy node, SSL communication may be established without enforcing mutual X.509 certificate authentication. After the SSL keys are created, the legitimate user provides credentials for authentication. At the end of the authentication process, the reverse proxy node sets a secure cookie at the browser associated with the legitimate user. All further requests for data access to the reverse proxy node will use this cookie as a session identifier to pass through to the reverse proxy node.

A Trojan running on the workstation of the legitimate user can pass the cookie to a man-in-the-middle (MITM), which might well be a malicious user. The MITM, in turn, can establish an SSL session by using the cookie as a passport to the reverse proxy node. This fraudulent session can be established by the MITM using the same process as that used by the legitimate user, using the stolen cookie to negate the effect of any security provided by authenticating the legitimate user on the reverse proxy node.

SUMMARY

In various embodiments, apparatus, systems, and methods that support secure network communications are provided. For example, in some embodiments, security may be enhanced by establishing a secure communications tunnel between a server node and a client node, and receiving user requests from the client node at the server node via the secure communications tunnel.

These user requests may be received in conjunction with a device verification token derived from nonces generated by the server node and transmitted to the client node as part of keep-alive response messages. The nonces may change according to a period of time established by the server node. Additional embodiments are described, and along with the foregoing example, will be set forth in detail below.

DETAILED DESCRIPTION

Some of the difficulties described above may be addressed by implementing a mechanism for secure communication between a workstation client and an HTTP reverse proxy server that does not use browser cookies to identify the user. Instead, a random number can be used to identify the user session between the client and the server. The random number does not need to be stored in the browser memory, and is therefore not readily accessible to Trojans operating on the client. A secure hash can be used along with the random number to identify the machine from which user requests originate. Together, these elements can be used to reduce the risk of vulnerability presented by stolen cookies.

Various embodiments of the invention can be implemented in a variety of architectural platforms, operating and server systems, devices, systems, and applications. Any particular architectural layout or implementation presented herein is thus provided for purposes of illustration and comprehension only, and is not intended to limit the implementation of various embodiments.

Figure 1:
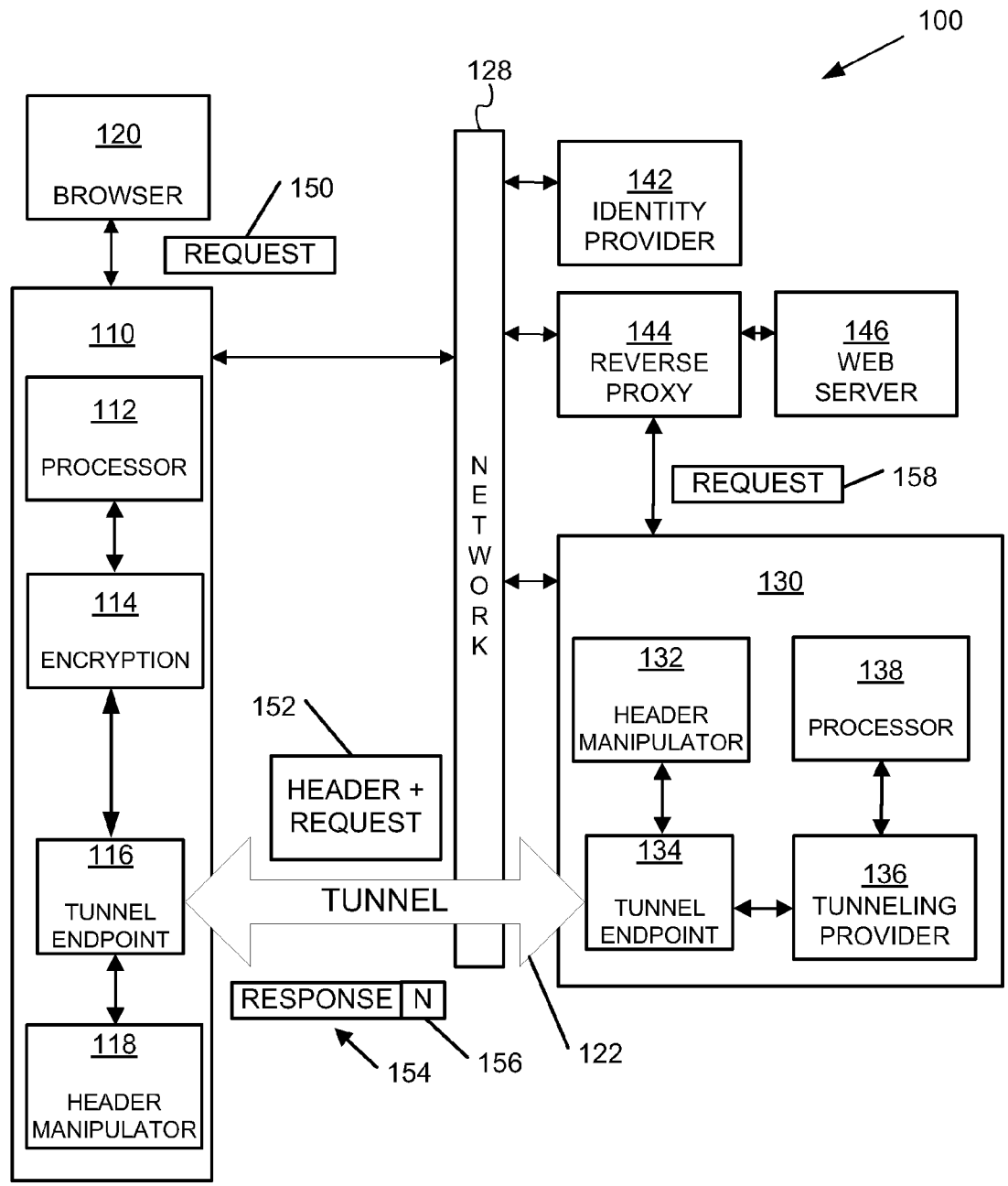
FIG. 1 is a block diagram of secure network communications apparatus and systems according to various embodiments of the invention.

FIG. 1 is a block diagram of secure network communications apparatus 110 and systems 100 according to various embodiments of the invention. The elements of the apparatus 110 and systems 100 will now be introduced in conjunction with an example description of their operation.

To begin, a user may operate a browser 120 to access the uniform resource locator address (e.g., https://www.proxy.com) of a reverse proxy server 144 by sending a request 150 to initiate authentication and thereby gain access to content, as permitted by the web server 146. Instead of redirecting the request 150 to an identity provider (IDP) 142 for authentication, the reverse proxy server 144 redirects the request 150 to a tunneling provider (TP) 136, which serves to protect the reverse proxy server 144 that provides access to the site www.proxy.com. In various embodiments, authenticated communication will thus occur through a dynamically-established tunnel 122 using special authentication headers.

Thus, when the reverse proxy server 144 receives an initial request 150 that has no special header, the request is redirected to the TP 136, which redirects the browser 120 to the identity provider, such as a Novell Access Manager Identity Provider (IDP) 142. As part of the authentication process, the user submits the authentication credentials via the browser 120.

Subsequently, the IDP 142 authenticates the browser and redirects the browser back to the TP 136. The TP 136, in turn, communicate with the reverse proxy server 144 over a back channel about the authenticated user.

The TP 136 then pushes the tunneling components on to the browser 120 and the apparatus 110 so that an SSL VPN tunnel 122 is established between the apparatus 110 (e.g., a workstation client) and the TP 136. Policies are now automatically established so that all further communication to the site www.proxy.com from the browser 120 will travel through the SSL VPN tunnel 122. The process of SSL VPN tunnel communication is well known to those of ordinary skill in the art, and therefore will not be discussed in detail in this document.

Once the TP 136 and reverse proxy server 144 have completed back channel communications, the TP 136 redirects the browser 120 to the site www.proxy.com. Communications will now flow through the established tunnel 122. However, before passing through the tunnel 122, the header manipulator 118 adds a USIN header to all messages for the purpose of identifying the user and the authenticated machine (e.g., apparatus 110). The details of header processing and insertion are discussed below.

HTTP requests 152, including the special header, are transmitted through the tunnel 122 from the tunnel endpoint 116 on the apparatus 110 to the tunnel endpoint 134 on the server node 130. The tunnel endpoint 134 operates to decrypt the SSL encryption in the message 152 and forwards the decrypted header to the header manipulator module 132.

The header manipulator module 132 then verifies the header for correct content, to check for the presence of any denial-of-service (DoS) or MITM attacks. After verification, the request 158 is forwarded to the reverse proxy server 144 (perhaps listening on the loopback port of the server node 130). The reverse proxy server 144, in turn, associates the session that includes the request 158 to the user and browser 120 using content in the USIN header, and then proceeds with its normal processing.

Thus, in most embodiments, requests (e.g., HTTP requests) 150 originating from the browser 120 or from an HTTP virtual private network (VPN) client node on the client machine (e.g., the apparatus 110) pass through the tunnel (e.g., a VPN tunnel) 122 as modified requests 152 after the VPN client inserts a USIN header with information to identify the client machine. The server node (e.g., a VPN server) 130 checks the correctness of the header information to verify that the request 152 originated from the designated machine (and not from another machine that might be associated with a malicious user).

The USIN header received by the server node 130 is then decrypted and passed to the reverse proxy server 144, which uses the information in the USIN header to relate the request 158 to a user associated with the apparatus 110. In this way, the USIN header can be used to carry user identification information and device identification information. Thus, as explained in more detail below, a random number in the form of a nonce 156 that changes value in a periodic fashion is transferred to the apparatus 110 using the tunnel 122 as part of keep-alive response message 154 packets. The value of the nonce 156 can only be learned by the apparatus 110 which was originally authenticated.

Figure 2:
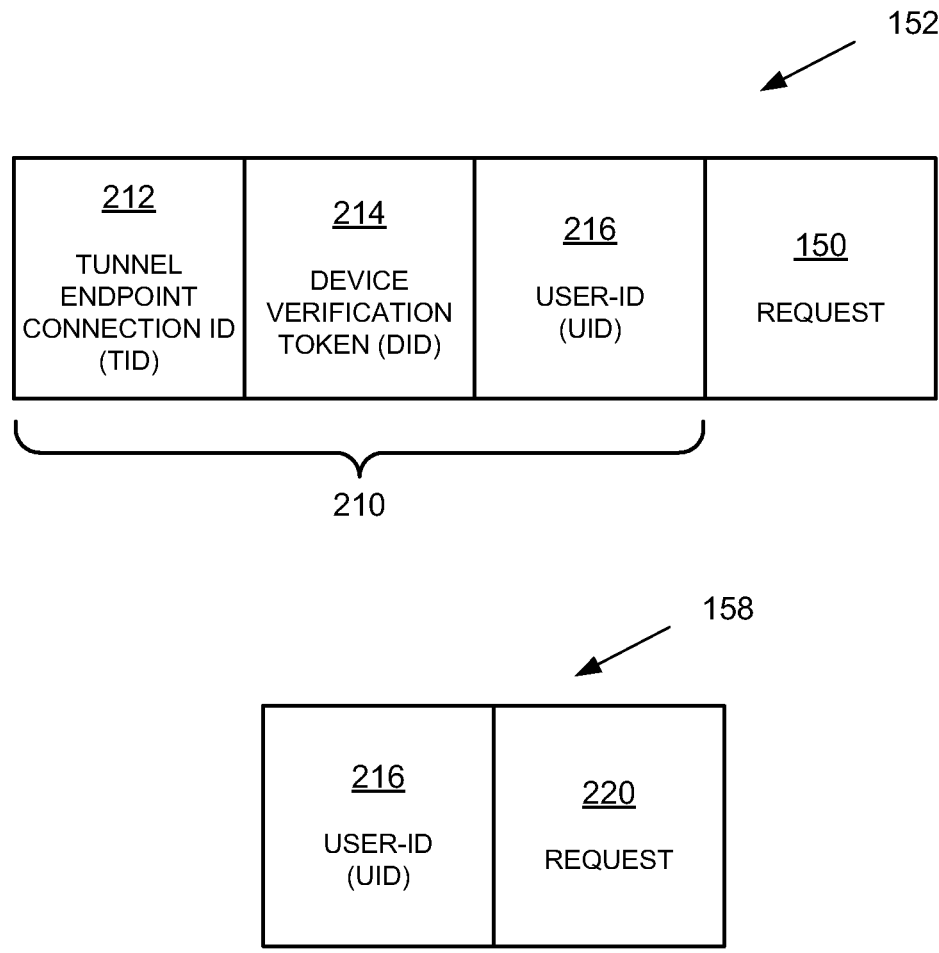
FIG. 2 illustrates a user session identification (USIN) header and other protocol elements that can be used in a secure network communications system according to various embodiments of the invention.

FIG. 2 illustrates a USIN header 210 and other protocol elements that can be used in a secure network communications system according to various embodiments of the invention. In some embodiments, the USIN header 210 comprises a fixed size header that includes a Tunneling End Point Connection ID (TID) 212, a Device Verification token (DID) 214, and a randomly generated user identification token (UID) 216.

Referring now to FIGS. 1 and 2, it can be seen that the tunneling endpoints 116, 134 (e.g., housed in a VPN client and VPN server, respectively) manage the TID 212, which is used to identify the origination point of the VPN connection.

The DID 214 is attributed to the authenticated machine. The DID 214, which may comprise a random number generated by the processor 138, can be transferred to the apparatus 110 while the tunnel 122 is being established.

The UID 216 is attributed to the authenticated user. The UID 216 has information that associates a request 150 to the authenticated apparatus 110. Thus, the DID 214 may comprise the hash of a nonce 156 and the UID 216.

During the time that the tunnel 122 is being established, the server node 130 will generate the initial nonce N-initial and transfer it to the apparatus 110 (outside of the tunnel 122). Immediately after the tunnel 122 is established, the keep-alive request-response protocol is started, and each keep-alive response message 154 will have a new encrypted nonce N-keepalive 156 (also generated by the server node 130). The header manipulator module 118 will decrypt the nonce N-keepalive 156 and use it to create a new DID 214.

During the short interval of time between the use of the initial nonce N-initial and the first of multiple subsequent nonces (e.g., the time the first N-keepalive nonce is generated), it may be possible for a Trojan operating on the apparatus 110 to learn the UID 216 and pass it on to a MITM (e.g., a malicious user) by breaking the SSL security provided between the tunnel endpoints 116, 134. To avoid this occurrence, the apparatus 110 can enforce a firewall rule that blocks all ports except the port coupled to the tunnel endpoint 134 prior to receiving the initial nonce N-initial.

The Trojan will not be able to transfer the nonce N-initial to the MITM machine until the firewall rule is switched off. In the meantime, the tunnel 122 can be established, and the first N-keepalive nonce can be received via the tunnel. Once the N-keepalive nonce is received, the firewall rule can be switched off to enable other ports, and the Trojan will be unable to learn the value of the N-keepalive nonce since it is now part of the OpenVPN keep-alive response message 154, and is thus encrypted.

Therefore, even if a Trojan is successful in learning the UID and the value of the initial nonce N-initial, security will be maintained. In this way, secure network communications between a network client and a reverse proxy server can be implemented without the use of vulnerable browser cookies. Many embodiments that implement this type of operation can be realized.

For example, it can be seen that in some embodiments an apparatus 110 may comprise a tunnel endpoint 116 to transmit user requests in conjunction with a device verification token to a server node 130 after a secure communications tunnel 122 to the server node 130 is established. The apparatus 110 may further comprise a processor 112 to manage transmission of the user requests and the device verification token (as a combination 152), the device verification token derived from nonces 156 generated by the server node 130 and received as part of keep-alive response messages 154, the nonces 156 changing according to a period of time established by the server node 130. In some embodiments, the apparatus 110 may comprise a workstation client, a tunneling client, or a client node operating in a virtual environment, for example.

A hash of each nonce 156 combined with a user identification token (e.g., the UID 216) may be made to generate the device verification token DID 214. Thus, the apparatus 110 may further comprise an encryption module 114 to form the DID 214 by encrypting a combination of one of the nonces 156 and a token (e.g., the UID 216) attributed to an authenticated user and associated with a user device, such as a cellular telephone or other browsing device, coupled to the apparatus 110.

The user request 150 can be augmented by a header 210 that includes both the DID 214 and a TID 212, among other information. Thus, the apparatus 110 may further comprise a header manipulator module 118 to append a header 210 including the DID 214 and a TID 212 to the user requests 150.

The secure network communications apparatus 110 may be implemented in a machine-accessible and readable medium and is operational over one or more networks 128. The networks 128 may be wired, wireless, or a combination of wired and wireless. The secure network communications apparatus 110 implements, among other things, the processing associated with the secure network communications methods 311 and 411 of FIGS. 3 and 4, respectively, discussed below. Modules may comprise hardware, software, and firmware, or any combination of these. Therefore, many additional embodiments may be realized.

For example, it can be seen that a secure network communications system 100 may comprise a tunneling provider module 136 to establish a secure communications tunnel 122 with a client node (e.g., apparatus 110). The system 100 may further comprise a processor 138 to receive user requests 150 from the client node via the secure communications tunnel 122, the user requests 150 received in conjunction with a device verification token derived from nonces 156 generated by the processor and transmitted to the client node 130 as part of keep-alive response messages 154, the nonces 156 changing according to a period of time selected by the processor 138. In some embodiments, the node 130 may comprise a tunneling server.

The system 100 may comprise a reverse proxy node 144 to process the user requests 158. Thus, the reverse proxy node 144 may be included as part of a tunneling server node 130.

In some embodiments, a secure network communications system 100 may be implemented in a machine-accessible and readable medium that is operational over one or more networks 128, whether wired, wireless, or a combination of wired and wireless. The secure network communications system 100 may include multiple instances of the apparatus 110 (e.g., multiple client nodes), and implements, among other things, the processing associated with the secure network communications methods 311 and 411 of FIGS. 3 and 4, respectively. These methods will now be described.

Figure 3:
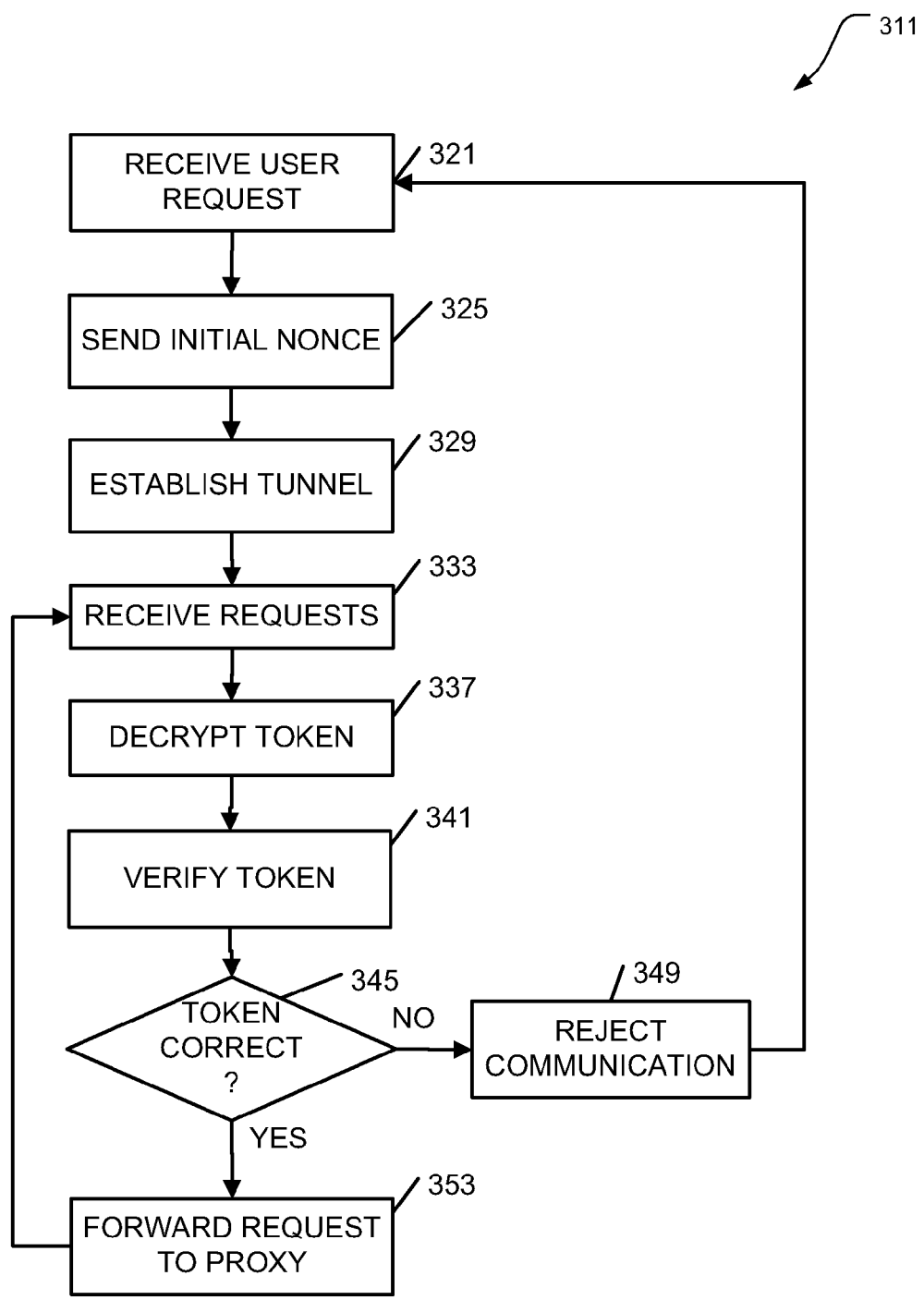
FIG. 3 is a flow diagram illustrating secure network communication methods according to various embodiments of the invention.

FIG. 3 is a flow diagram illustrating secure network communication methods 311 according to various embodiments of the invention. The methods 311 are implemented in a machine-accessible and readable medium. The secure network communication methods 311 are operational over processes within and among networks. The networks may be wired, wireless, or a combination of wired and wireless. The methods 311 may be implemented as instructions, which when accessed by a machine, perform the processing depicted in FIG. 3. Given this context, secure network communication is now discussed with reference to FIG. 3.

In some embodiments, a method 311 may begin at block 321 with receiving an initial user request at a tunneling provider communicatively coupled to a server node. The initial user request may comprise a redirected request from a proxy node.

Prior to establishing a secure tunnel for conducting communications, the method 311 may continue on to block 325 with sending an initial nonce from the server node to the client node when the client node is blocking all ports except a port coupled to the server node. The initial nonce can be securely transmitted to the client node because it is transmitted over a connection that can't be accessed by any entity except the server node that sends it. The initial nonce is thus not necessarily encrypted.

The method 311 may continue on to block 329 with establishing a secure communications tunnel between the server node and the client node. The secure communications tunnel may comprise a VPN tunnel, among other types.

The method 311 may go on to include, at block 333, receiving user requests from the client node at the server node via the secure communications tunnel. One type of user request formatting may include HTTP formatting. Thus, the user requests may be formatted according to HTTP standards.

The user requests may be received in conjunction with a DID derived from nonces generated by the server node and transmitted to the client node as part of keep-alive response messages. As noted previously, the nonces may be changed according to a period of time established by the server node.

Thus, as viewed from the server side, various embodiments may comprise the use of keep-alive requests that include nonces that are updated by the server on a periodic basis. The user request messages sent to the server, in turn, derive DIDs from the nonces. Thus, the activity at block 333 may further comprise receiving the DID as part of a UIN header comprising a TID.

The use of keep-alive messages are well known to those of ordinary skill in the art, and are used to ensure that network connectivity exists between the tunnel end points. If the keep-alive requests are not received by the server or keep-alive responses are not received by the client, the secure tunnel will be torn down. As explained herein, various embodiments also use keep-alive messages to transport newly-generated nonces from the server to the client.

Once the request and appended header are received, the DID is decrypted to make it possible to extract the nonce and the authenticated user identification. The authenticated user identification is part of the UIN header. The DID is used as a map to the authenticated machine. In this way, the DID can be used to extract the authenticated user identification. Thus, the method 311 may go on to block 337 to include decrypting the device verification token.

If the DID token does not include the proper nonce, then further communication using the tunnel may be prohibited. Thus, the method 311 may go on to comprise, at block 341, verifying, at the server node, that the DID includes one of the nonces most recently transmitted to the client node.

Requests that do not include the correct DID, such as from an MITM (e.g., a malicious entity) can be rejected. Thus, the method 311 may include receiving one of the user requests as part of an attempted communication from a MITM, the attempted communication comprising an incorrect device verification token. If this occurs, as detected at block 345, the method 311 may further comprise rejecting the attempted communication at block 349.

Once the content of the DID is verified, the user request can be forwarded from the server node to the reverse proxy node. Thus, if the token is correct, as determined at block 345, the method 311 may include forwarding the user requests from the server node to a proxy node after the content of the DID has been verified. Still further embodiments may be realized.

Figure 4:
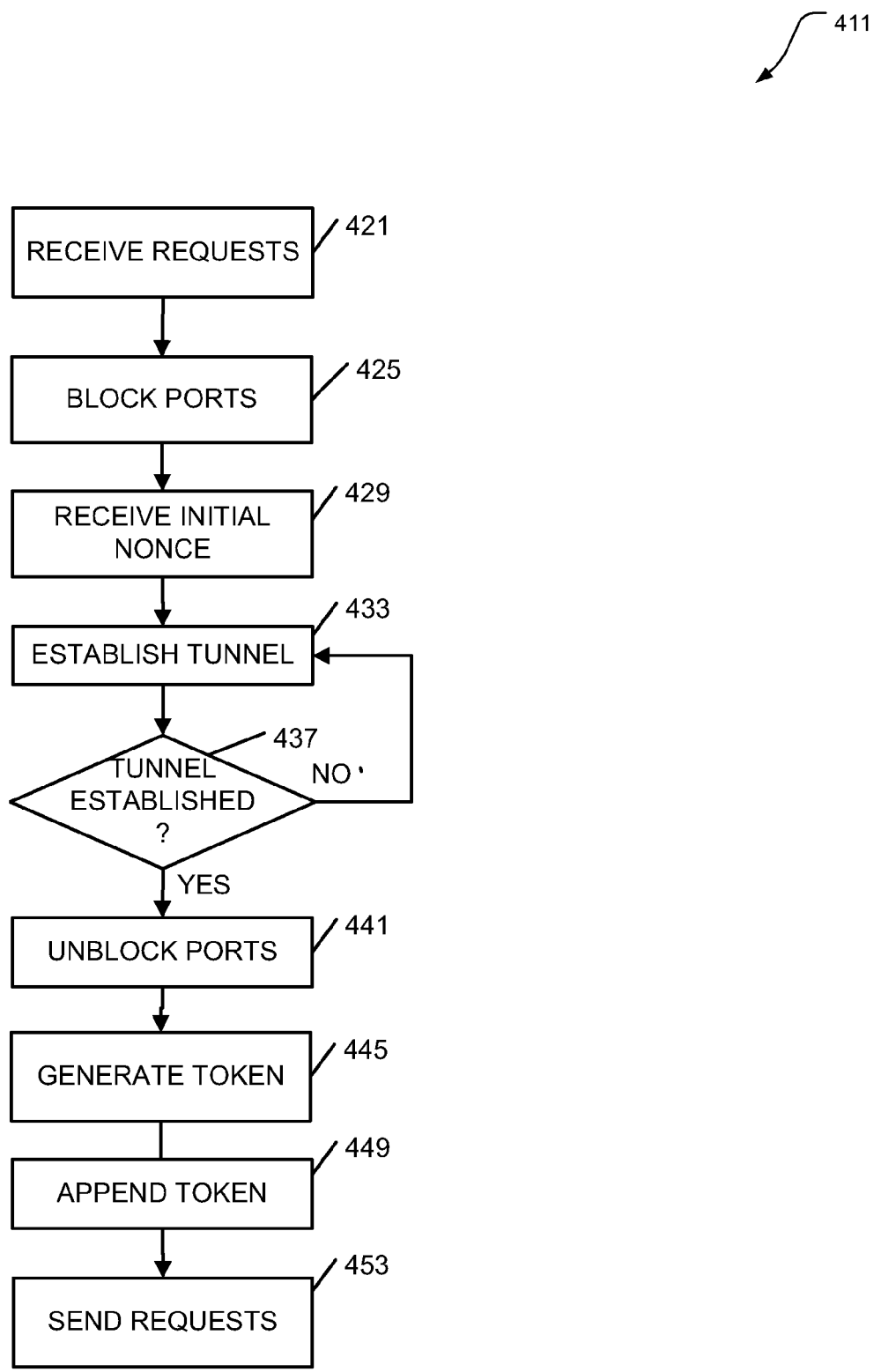
FIG. 4 is another flow diagram illustrating secure network communication methods according to various embodiments of the invention.

For example, FIG. 4 is another flow diagram illustrating secure network communication methods 411 according to various embodiments of the invention. In this case, secure network communications are described with additional emphasis on request generation operations. The methods 411 are implemented in a machine-accessible and readable medium. The secure network communication methods 411 are operational over processes within and among networks. The networks may be wired, wireless, or a combination of wired and wireless. The methods 411 may be implemented as instructions, which when accessed by a machine, perform the processing depicted in FIG. 4.

Thus, to implement secure network communications, a method 411 may begin at block 421 with receiving user requests at a client node from a user device associated with an authenticated user. For example, user requests can be originated by a user device (e.g., laptop computer, personal digital assistant, or cellular telephone) that runs a browser application coupled to the client node.

The method 411 may go on to block 425 to include blocking all ports of the client node except a single port to be coupled to the server node. The method 411 may further comprise receiving an initial nonce from the server node at the client node via the single port at block 429. In this way, the initial nonce can be received by the client node from the server node at a single unblocked port.

A secure communications tunnel is then established, prior to unblocking the ports. Thus, the method 411 may go on to block 433 with establishing a secure communications tunnel between the client node and the server node. Once the tunnel is established, as determined at block 437 (the method 411 may include looping on block 437 until the tunnel is in place), the method 411 may go on to block 441 to include unblocking the ports after the initial nonce is received by the client node and the secure communications tunnel is established.

The DID can be formed as a substantially unique combination of the nonce and an authenticated user identification. Thus, the method 411 may go on to block 445 to include generating the DID to identify the user device coupled to the client node, the device verification token generated as a hash of one of the nonces and a token attributed to an authenticated user associated with the user device.

The DID may form part of a header joined to the user request. Thus, the method 411 may include, at block 449, appending the DID (as part of the UIN header) to the user requests. As noted previously, the header may comprises a TID.

The method 411 may go on to comprise sending user requests from the client node to the server node via the secure communications tunnel at block 453. As noted above, the user requests may be sent in conjunction with the DID derived from nonces generated by the server node and transmitted to the client node as part of keep-alive response messages, the nonces changing according to a period of time established by the server node, perhaps over time periods ranging from a few seconds to several minutes.

The methods described herein do not have to be executed in the order described, or in any particular order. Moreover, various activities described with respect to the methods identified herein can be executed in repetitive, serial, or parallel fashion. The individual activities of the methods shown in FIGS. 3 and 4 can also be combined with each other and/or substituted, one for another, in various ways. Information, including parameters, commands, operands, and other data, can be sent and received in the form of one or more carrier waves. Thus, many other embodiments may be realized.

The apparatus, systems, and methods described herein may thus provide the ability to implement communications between a reverse proxy node and a browser, in a secure manner that does not rely on cookies for authentication. By using dynamically-generated and periodically changing USIN information that is communicated to the client node, security is maintained even if the USIN is stolen by a Trojan running on the client, since the USIN will not operate using a different client machine. Increased network security and user productivity may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
 a server at a server node for authenticating a user at a client node;
  a secure tunnel established by the server node and the user node to transmit user requests in conjunction with a user identification token and a device verification token from a user device at the client node through the secure communications tunnel to the server node, the secure tunnel being established to transmit said user requests following authentication of the user; and
  a processor to manage transmission of the user requests, the user identification token and the device verification token, the user identification token being derived from a random number from the server and user identification information of the user, the device verification token identifying the user device and being derived from the user identification token and from nonces generated by the server node as part of keep-alive response messages, the nonces changing according to a period of time established by the server node.

2. The apparatus of claim 1, further comprising: an encryption module to form the device verification token by encrypting a combination of one of the nonces and the user identification token attributed to an authenticated user associated with the user device coupled to the apparatus.

3. The apparatus of claim 1, further comprising:
 a header manipulator module to append to user requests a header including the user identification token, the device verification token and a tunnel endpoint connection identification.

4. A system, comprising:
 a tunneling provider module to establish a secure communications tunnel between a server node and a client node for a user following authentication of the user; and
 a processor to receive user requests from the client node via the secure communications tunnel, the user requests received in conjunction with a user identification token of a user of a device at the client node and a device verification token identifying the user device, the device verification token being derived from the user identification token and nonces generated by the processor and transmitted to the client node as part of keep-alive response messages, the nonces changing according to a period of time selected by the processor, the user identification token being derived from a random number from the server node and user identification information of the user.

5. The system of claim 4, wherein the server node comprises a reverse proxy node to process the user requests.

6. The system of claim 4, wherein the random number is randomly generated at the server node and transmitted to the client node upon the user requesting authentication and prior to receiving a user request.

7. A computer-implemented method, comprising:
authenticating at a server node a user located at a client node;
establishing to transmit requests of the user following said authenticating a secure communications tunnel between the server node and the client node;
and receiving at the server node user requests from a user device of said user at the client node via the secure communications tunnel, the user requests received in conjunction with a user identification token derived from a random number from the server node and user identification information of the user, and a device verification token identifying the user device and being derived from said user identification information and from nonces generated by the server node and transmitted to the client node as part of keep-alive response messages, the nonces changing according to a period of time established by the server node.

8. The method of claim 7, further comprising:
prior to the establishing, sending an initial nonce from the server node to the client node when the client node is blocking all ports except a port coupled to the server node.

9. The method of claim 8, wherein the initial nonce is not encrypted and is used to form the user identification token.

10. The method of claim 7, further comprising:
receiving an initial user request at a tunneling provider communicatively coupled to the server node, wherein the initial user request comprises a redirected request from a proxy node, said tunneling provider establishing said secure tunnel.

11. The method of claim 10, wherein the user requests have a header that comprises the device verification token, the user identification token, and a tunnel endpoint connection identification.

12. The method of claim 7, wherein the device verification token is generated as a hash of one of the nonces and the user identification token of the user.

13. The method of claim 7, further comprising: verifying, at the server node, that the device verification token includes one of the nonces most recently transmitted to the client node.

14. The method of claim 7, further comprising:
forwarding the user requests from the server node to a proxy node after content of the device verification token has been verified.

15. The method of claim 7, wherein the secure communications tunnel comprises a virtual private network tunnel.

16. The method of claim 7, wherein the user requests are formatted according to a HyperText Transfer Protocol.

17. The method of claim 7, comprising:
a user request from a device having an incorrect device verification token as part of an attempted communication from a man-in-the-middle.

18. A computer-implemented method, comprising:
authenticating at a server node a user located at a client node;
establishing a secure communications tunnel between the client node and the server node following said authenticating; and
sending user requests from the client node to the server node via the secure communications tunnel, the user requests sent in conjunction with a user identification token derived from a random number from the server node and user identification information of the user and a device verification token identifying a user device of the user, the device verification token being derived from the user identification token and nonces generated by the server node and transmitted to the client node as part of keep-alive response messages, the nonces changing according to a period of time established by the server node.

19. The method of claim 18, further comprising:
appending the user identification token and the device verification token as part of a header to the user requests.

20. The method of claim 19, wherein the header further comprises a tunnel endpoint connection identification.

21. The method of claim 18, further comprising:
generating the device verification token to identify the user device as a hash of one of the nonces and the user identification token of the user.

22. The method of claim 18, further comprising:
blocking all ports of the client node except a single port to be coupled to the server node; and receiving an initial nonce from the server node at the client node via the single port, the initial nonce being used to form the user identification token.

23. The method of claim 22, further comprising:
unblocking the ports after the initial nonce is received by the client node and the secure communications tunnel is established, and transmitting all further communications between the client node and the server through the secure communications tunnel.

24. The method of claim 18, further comprising: receiving the user requests at the client node from a user device associated with an authenticated user.

* * * * *